Figure 1:
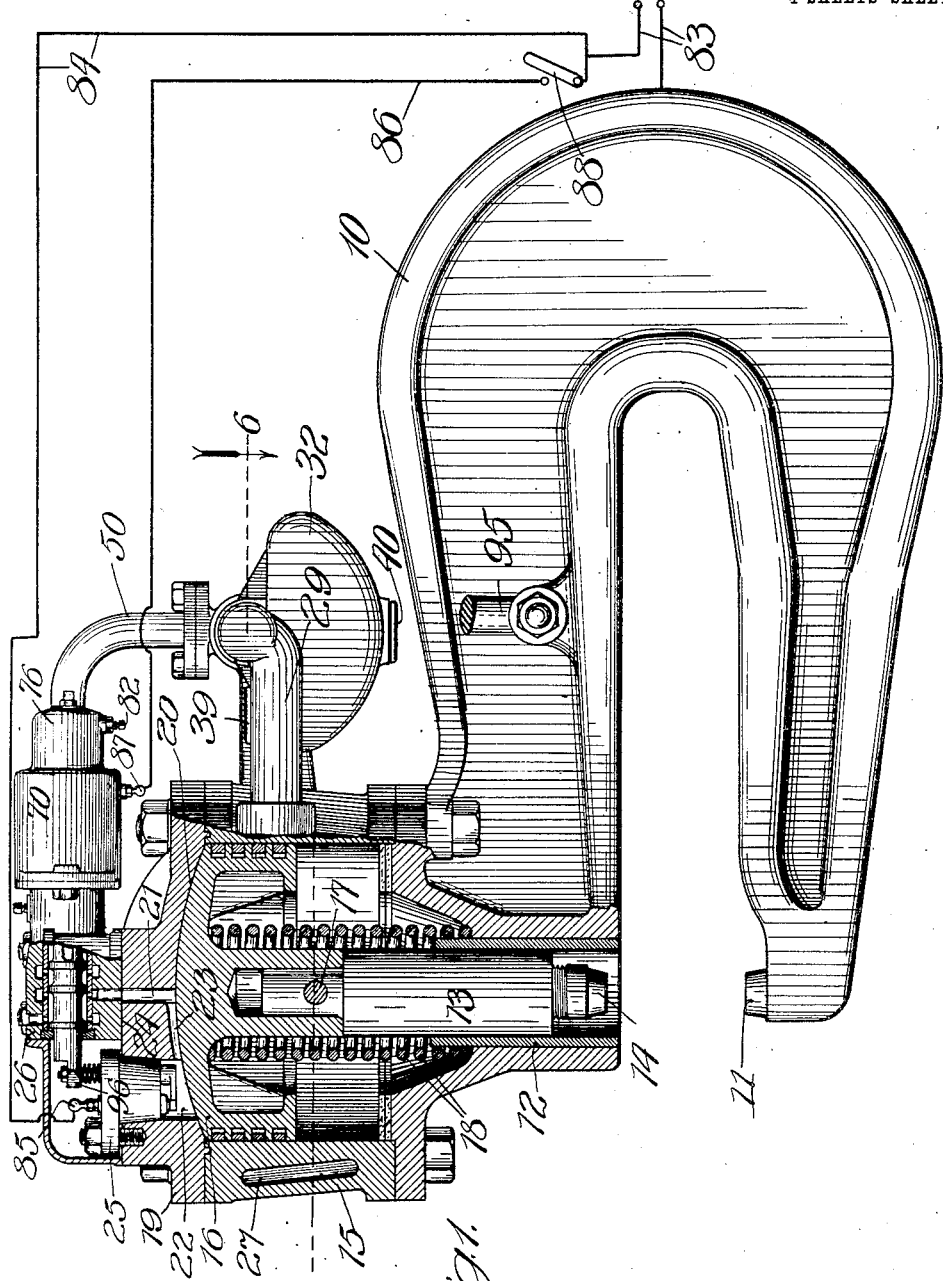

M. C. WHITE & O. C. DURYEA.
POWER DEVICE.
APPLICATION FILED DEC. 26, 1911.

1,033,505.

Patented July 23, 1912.

4 SHEETS—SHEET 1.

Witnesses:
Ralph A. Schaefer
A. U. Thorien

Inventors:
Morris C. White
Otho C. Duryea,
By Dyrenforth, Lee, Chritton & Wiles
Att'ys.

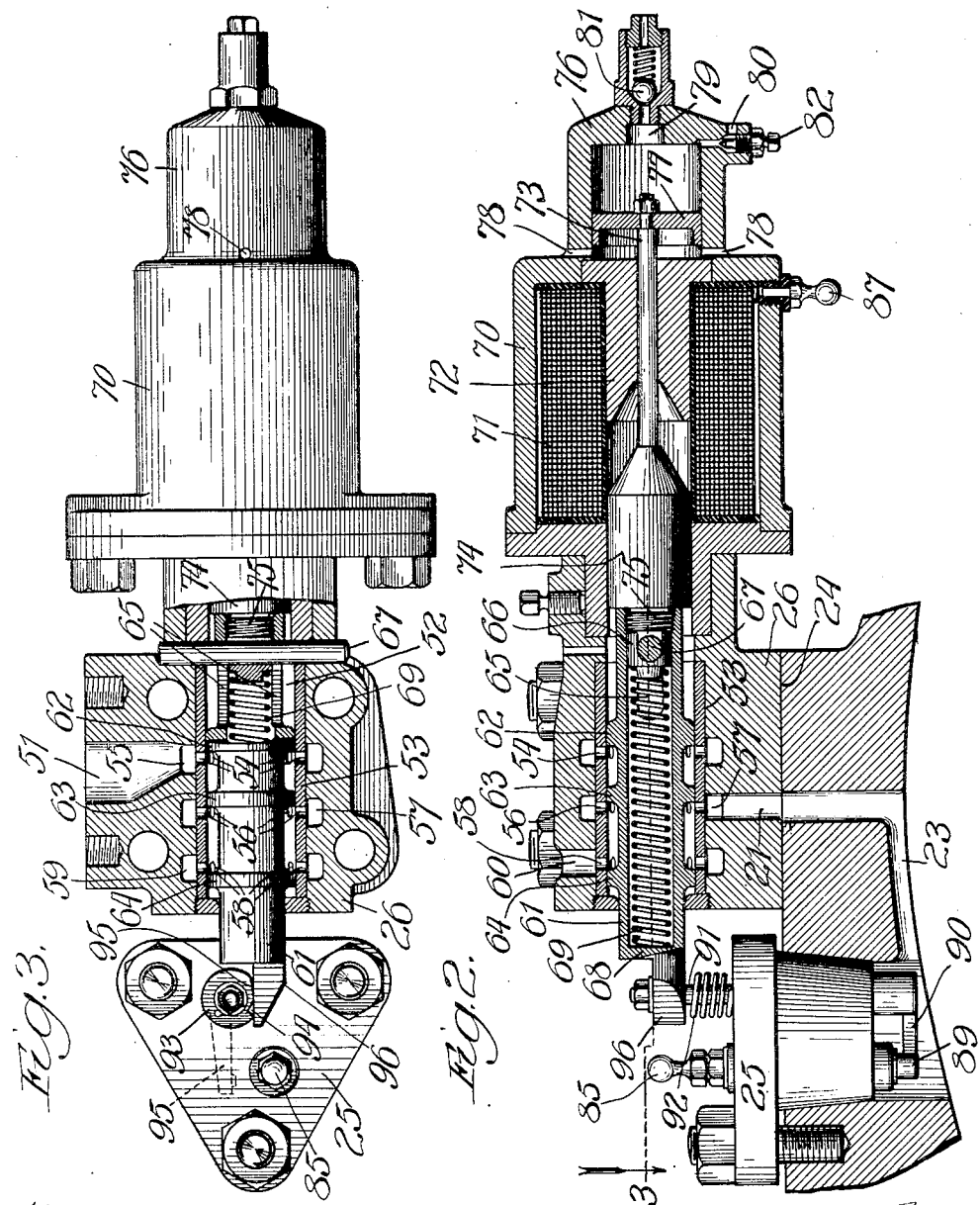

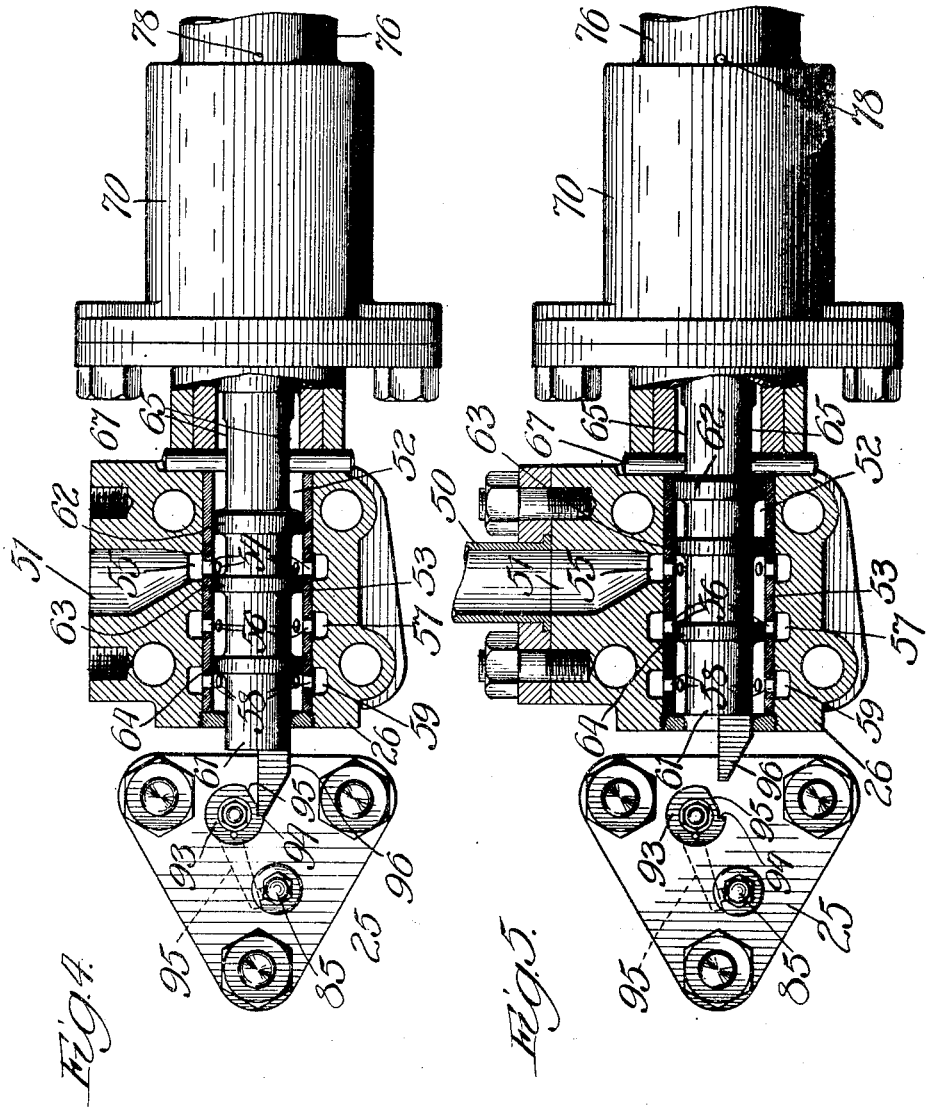

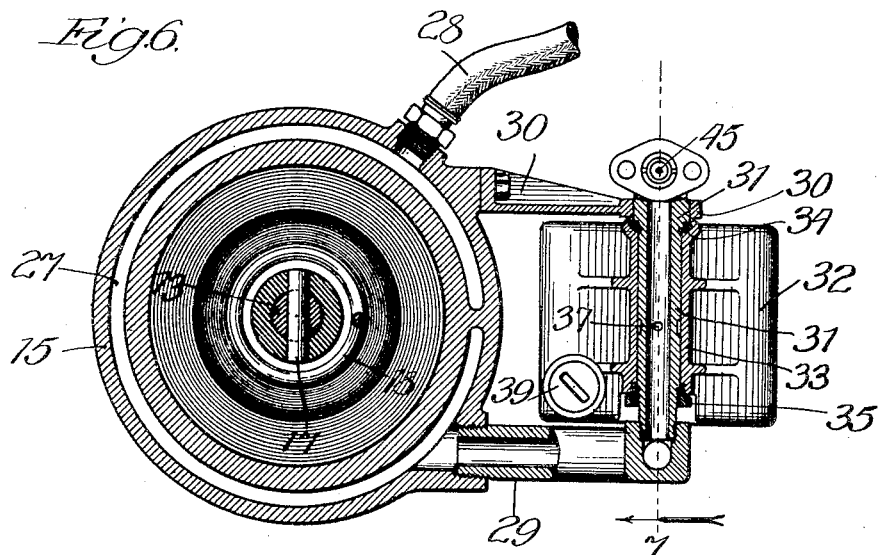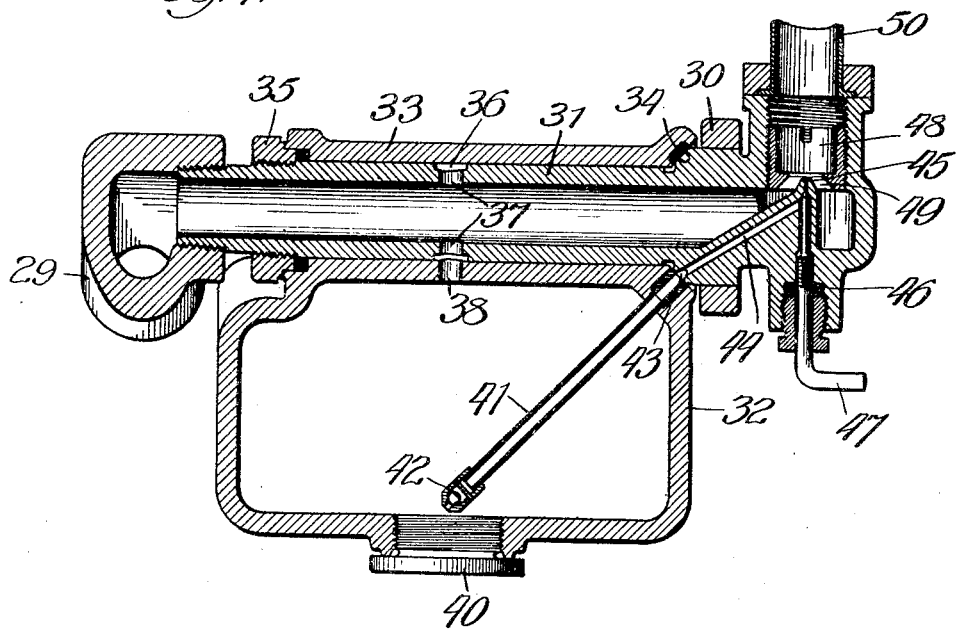

UNITED STATES PATENT OFFICE.

MORRIS C. WHITE AND OTHO C. DURYEA, OF CHICAGO, ILLINOIS.

POWER DEVICE.

1,033,505.　　　　　　　Specification of Letters Patent.　　Patented July 23, 1912.

Application filed December 26, 1911. Serial No. 667,705.

*To all whom it may concern:*

Be it known that we, MORRIS C. WHITE and OTHO C. DURYEA, citizens of the United States, residing at Chicago, in the county of Cook and State of Illinois, have invented a new and useful Improvement in Power Devices, of which the following is a specification.

Our object is to provide an internal-combustion power-device of simple and improved construction adapting it, more especially, for the class of work, such as riveting, punching and the like, which may be accomplished by a single progressive movement of a work-performing member.

Our present construction is devised, more particularly, for employment in manufacturing plants which are equipped with air-compressors and compressed-air lines to be actuated, primarily, by the force of the compressed air and to supplement said force by carbureting the air as it enters the cylinder of the device, then trapping and exploding the mixture in the cylinder to operate, or complete the operation of, the work-performing member in each instance.

In the accompanying drawings, we show our improvements, in one desirable form, applied to a power-riveter.

Referring to the drawings—Figure 1 is a view of the riveter partly in elevation and partly in section; Fig. 2, an enlarged broken sectional view showing the valve and attendant moving parts in initial position, the same as in Fig. 1; Fig. 3, a partly sectional plan view, the section being taken on line 3 in Fig. 2; Figs. 4 and 5, views corresponding with Fig. 3, but showing moving parts in different positions; Fig. 6, a plan section taken on irregular line 6, 6 in Fig. 1; and Fig. 7, an enlarged section taken on line 7 in Fig. 6.

On the lower fork of the yoke-frame 10 is an anvil 11, and in the upper fork is an opening fitted with a cylindrical liner 12 in which works a stem or holder 13 carrying the riveting tool, or work-performing member, 14. Bolted upon the yoke is a cylinder 15 fitted with a piston 16. The stem 13 is fastened to the piston by means of a pin 17 and the piston is held normally retracted by a return-spring 18. The upper end of the cylinder is closed by a cylinder-head 19 secured in place by bolts. The inner face of the cylinder-head 19 presents a concave surface 20 and the piston 16 presents a convex surface conforming thereto and contacting therewith when the piston is retracted. At the center of the cylinder-head is an inlet-opening 21 and at one side thereof is a chamber 22, the inlet and chamber being joined by a shallow groove 23 in the face 20. The outer face of the cylinder-head presents a flat face 24 forming a seat on which is bolted a sparking-device or electric igniter 25 which extends into the chamber 22. Also bolted upon the face 24 is a valve-chest 26. In the cylinder-head is a chamber or passage 27 communicating near one end with a compressed-air pipe-line 28 extending thereto from an air-compressor or compressed-air supplier, not shown. Extending from the opposite end-portion of the passage 27 is a pipe 29, and secured to the cylinder 15 is a bracket 30 extending parallel with the pipe 29. Screwed into the end-portion of the pipe 29 is a tube 31 passing toward its opposite end-portion through an opening in the bracket 30.

The numeral 32 designates a tank for holding gasolene or other liquid, and suitable volatile, hydrocarbon. The top-wall of the tank forms a sleeve 33 fitting closely around the tube 31, whereby the tank is supported to swing in the vertical plane. At one end the sleeve 33 flares slightly and is fitted with a soft metal gasket or bearing-face 34, bearing against a similarly-flaring surface on the tube 31; and at its opposite end the sleeve 33 is fitted with a stuffing-box, the nut 35 of which turns upon a threaded section of the tube 31. At about midway between its ends the tube 31 has an outer annular groove or channel 36 communicating with the interior of the tube through openings 37; and in the top of the tank 32 is an opening 38 registering with the channel 36.

The tank is provided with a filling-opening closed by a screw-cap 39 and it has a drainage or clean-out opening in its base closed by a screw-cap 40. Extending upward from near the base of the tank and through the top-wall to the bearing-face 34 is a tube 41 normally closed at its lower end by a ball, or check, valve 42. In the inclined face of the tube 31, against which the bearing-face 34 of the sleeve seats, is an annular groove or channel 43 from which extends the passage 44. The passage 44 terminates in a tapering spray-outlet or nozzle 45, which is governed by a needle-valve 46 having a handle 47. At the end of the tube 31, and forming part thereof, is a chamber 48 with which the tube communicates through a tapering opening 49 about the nozzle 45. Extending from the chamber 48 is a pipe 50 terminating at the inlet-opening 51 of the valve-chest 26. The valve-chest chamber 52 is cylindrical and provided with a liner 53. In the liner is an annular series of inlet-ports 54 surrounded by a channel 55 communicating with the inlet-passage 51; an annular series of ports 56 communicating with a surrounding channel 57 leading to the cylinder-port 21; and an annular series of exhaust-ports 58 communicating, through a surrounding channel 59, with the exhaust-outlet 60. Fitting and sliding in the liner 53 is a spool-valve 61 formed with the three rings or pistons 62, 63 and 64, in the relative positions shown. The spool-valve is hollow and toward one end is provided at opposite sides with elongated slots 65. In the said end is a loosely-fitting plug 66 held stationary by means of a pin 67 passing through the wall of the valve-chest and through the slots 65 in the spool-valve. In the spool-valve and confined between a closed end 68 thereof and the plug 66 is a spring 69 which tends normally to maintain the spool-valve in the position indicated in Figs. 1, 2 and 3.

Secured against the end of the valve-chest 26 is a chamber or casing 70 containing a solenoid or spool-magnet 71 having a core 72. Extending through the core is a stem 73 carrying an armature 74. On the armature is a threaded boss 75 which is screwed into the end of the spool-valve 61, thereby securing the latter to the armature 74 and its stem. On the end of the casing 70 is a chamber or casing 76 forming a cylinder for a piston 77 carried by the stem 73. The cylinder 76 is provided in the positions shown with vent-openings 78, an outlet-opening 79 and an inlet-opening 80. The outlet-opening 79 is normally closed by a spring-pressed ball, or check-valve, 81 and the opening 80 is governed by a needle-valve 82. The numeral 83 designates the mains of an electric circuit one of which terminates at the yoke 10 or any other stationary metallic part of the frame. One branch 84 of the other main extends to a binding-post 85 on the igniter or spark-plug 25, and another branch 86 thereof extends to the terminal or binding-post 87 of the solenoid-magnet. In the branch 86 is a switch 88 of any suitable form and which, in practice, may be of the well-known push-button type.

The spark-plug 25 has a stationary contact 89, connected with the binding-post 85, and a swinging contact 90 carried by a rock-shaft 91. On the rock-shaft 91 is a spring 92, which tends normally to turn the shaft in its bearing to cause the contact 90 to engage the contact 89; and also on the rock-shaft is a disk 93 having a notch 94 and a flat surface or shoulder 95. The notch 94 on the disk, when the contacts 89, 90 are closed, is in the path of a finger-extension 96 of the spool-valve 61, and in the movement of the latter from the position shown in Fig. 5 to that shown in Fig. 3, the finger 96 first engages the notch 94, then swings the disk to break the contacts 89, 90 and then slides along the shoulder 95 to hold the said contacts open.

In practice, compressed-air from the pipe-line 28 moves into the passage 27 around the cylinder 15 and thence through the pipe 29 to the tube 31. The pipe-line air enters through the openings 37, channel 36 and opening 38 to the interior of the fuel-tank 32, to maintain the same at pipe-line pressure. From the tube 31 the air passes through the tapering outlet 49 across the end of the spray-tube or carbureter 45 to the pipe 50 leading to the valve-chest inlet-opening 51. While the parts are in normal position indicated in Figs. 1, 2 and 3, the contacts 89, 90 of the spark-plug are separated, the cylinder-port 21 is open to the exhaust 60 and the inlet-port 54 is blanked, so that no air enters and there is no current from the pipe-line to the cylinder. Thus while the device is inactive no air escapes from the pipe-line and no fuel or electric current is consumed.

For the purpose of operating the device to set a rivet, the operator simply closes the switch 88, causing current to flow to the solenoid. Immediately that the magnet 71 is excited the armature 74 is drawn into contact with the core 72, shifting the spool-valve and attendant parts to the position shown in Fig. 5. In this movement the piston 77 travels to the right in Fig. 2, discharging air from the cylinder 76 through the port 79, the check-valve of which opens freely. In this movement, furthermore, the finger 96 disengages the disk 93, permitting the contacts 90, 89 of the spark-plug to be closed by the spring 92. This movement of the spool-valve to the position shown in Fig. 5 establishes communication between the inlet-port or ports 54 and the port or ports 56 leading to the cylinder. All the air entering from the pipe-line 28 and passing the carbureter 45, as explained, becomes suitably carbureted to produce the desired explosive mixture, and the first of said mixture entering the cylinder 15, while the piston 16 is retracted as shown in Fig. 1, passes through the groove or channel 23 to the chamber 22. Simultaneously therewith the piston commences to move downward, so that the first portion of the charge sweeps the chamber 22 of any remnants of a former exploded charge. The operator holds the switch 88 closed while the pressure entering the cylinder 15 moves the piston until the work-performing member 14 comes into contact with the rivet to be set. He then opens the switch 88, to shut off the current to the solenoid, causing the armature 74 to be released and permit the spring 69 to move it and the spool-valve to and beyond the position shown in Fig. 4 to the position shown in Figs. 1, 2 and 3. Thus, as soon as the piston-portion 63 of the spool-valve crosses and blanks the port 54, to shut off further supply of mixture to the cylinder, the finger 96 engages the notch 94 of the disk 93, and starts turning the same against the resistance of the spring 92 to separate the sparker-contacts 89, 90. This produces a spark, to ignite the charge in the cylinder, causing an explosion which drives the piston outward and causes the work-performing member to set the rivet under the force of the explosion. Immediately after the explosion the piston 64 of the spool-valve crosses the port 58, thus opening the port 56 thereto and causing the cylinder to exhaust, at which time the parts come to rest ready for another operation. The speed of movement of the spool-valve from the position shown in Fig. 5 to that shown in Figs. 1, 2 and 3 is governed by the entrance of air through the port 80 to overcome the relative vacuum in the cylinder 76 as its piston 77 is moved under the force of the spring 69. This is controlled by the needle-valve 82 which may be set to permit air to enter through the port 80 and cause the spool-valve to be moved at the speed desired to give the proper time between the explosion in and the exhaust from the cylinder 15.
Our improved device operates very rapidly and can be employed to set rivets, for example, as fast as it is possible to position the work in the device. The compressed air, passing from the pipe 28 to the carbureter, by sweeping around the cylinder 15 tends to keep the same from becoming overheated, and the warming effect upon the air aids in the carbureting thereof as it sweeps through the carbureter. It is quite common to mount the yoke-frame of a riveter in a bail 95, as shown, so that it may be swung to different angles in the vertical plane. In the present device the fuel-tank turns readily upon its support, so that it will remain upright in any position of the yoke.

The foregoing description is intended to convey a clear understanding of our improvements in what we now believe to be the best form of their embodiment, and no undue limitation should be understood therefrom. It is our intention to claim all that is novel in our invention, and that the claims shall be construed as broadly as the prior state of the art may warrant.

What we claim as new, and desire to secure by Letters Patent, is—

1. The combination with a compressed-air conduit, of means for carbureting the air to produce an explosive mixture under pressure, a power-device, of the character described, having a cylinder and piston, forming parts movable one with relation to the other, a work-performing member operatively connected with the moving part, an igniter in the cylinder, valve-mechanism interposed between the conduit and cylinder, movable to direct the mixture under pressure to the cylinder against the piston, thereby to advance the work-performing member against the work, then to trap the charge in the cylinder and then to exhaust the cylinder, and igniter-actuating means coöperating with the valve-mechanism to explode the charge while the same is trapped.

2. The combination with a compressed-air conduit, of means for carbureting the air to produce an explosive mixture under pressure, a power-device of the character described, having a cylinder and piston, forming parts movable one with relation to the other, a work-performing member operatively connected with the moving part, an igniter in the cylinder, and igniter-actuating valve-mechanism, interposed between the conduit and cylinder, movable to direct the mixture under pressure to the cylinder against the piston, thereby to advance the work-performing member against the work, then to trap and explode the charge in the cylinder and then to exhaust the cylinder.

3. The combination with a compressed-air conduit, of means for carbureting the air to produce an explosive mixture under pressure, a power-device of the character described, having a cylinder and piston forming parts movable one with relation to the other, a work-performing member operatively connected with the moving part, an igniter in the cylinder, valve-mechanism interposed between the conduit and cylinder, manually-controlled means for moving the valve-mechanism to an advanced position to direct the mixture under pressure to the cylinder, automatic-returning means for the valve-mechanism, operating to first close communication with the conduit, to trap the charge in the cylinder, and then to exhaust the cylinder, and igniter-actuating means cooperating with the valve-mechanism, to explode the charge while the same is trapped.

4. In a power-device of the character described, the combination with a piston and cylinder and a compressed explosive-mixture supplying conduit for the cylinder, of valve-mechanism interposed between the conduit and cylinder, operating when moved to one position to open communication between the said conduit and cylinder and in a single progressive return movement, from said position, to first close said communication, to trap the charge in the cylinder, and then open the cylinder-exhaust, an igniter in the cylinder, igniter-actuating means, coöperating with the valve-mechanism, to explode the charge while the same is trapped, and means controlling the speed of said return movement of the valve-mechanism.

5. In a power-device of the character described, the combination with a piston and cylinder and a compressed explosive-mixture supplying conduit for the cylinder, of valve-mechanism, interposed between the conduit and cylinder, manually-controlled means for moving the valve-mechanism to one position, to open communication between said conduit and cylinder, means operating, when the valve-mechanism is released by said manually-controlled means, to return the valve-mechanism to first close said communication, to trap the charge in the cylinder and then open the cylinder-exhaust, an igniter in the cylinder, and igniter-actuating means, coöperating with the valve-mechanism, to explode the charge while the same is trapped.

6. In a power-device of the character described, the combination with a piston and cylinder and a compressed explosive-mixture supplying conduit, of valve mechanism interposed between the conduit and cylinder, a normally open electric circuit with means for closing it, a valve-shifting solenoid in said circuit, operating when the circuit is closed to move the valve-mechanism to one position, to open communication between said conduit and cylinder, and means operating, when said circuit is opened, to return the valve-mechanism to first close said communication, to trap the charge in the cylinder, and then open the cylinder-exhaust, an igniter in the cylinder, and igniter-actuating means coöperating with the valve-mechanism, to explode the charge while the same is trapped.

7. In combination with a compressed-air conduit, a power-device of the character described and movable to different angles in the vertical plane, having a compressed-air passage communicating with said conduit, a swinging liquid-fuel holder, a fuel-supply tube extending from said holder to said passage to carburet the compressed air therein, a cylinder and piston, an igniter in the cylinder, valve-mechanism, interposed between the conduit and cylinder, movable to direct the mixture under pressure against the piston, then to trap the charge in the cylinder, and then to exhaust the cylinder, and igniter-actuating means operating to explode the charge while the same is trapped.

MORRIS C. WHITE.
OTHO C. DURYEA.

In presence of—
R. A. RAYMOND,
O. C. AVISUS.